United States Patent [19]
Manea et al.

[11] Patent Number: 5,872,592
[45] Date of Patent: Feb. 16, 1999

[54] TEST SIGNALS AND TEST SIGNAL GENERATORS

[75] Inventors: Andrei Manea; Thomas Scholz; Jens Wohlers; Rolf Putzhofen, all of Hamburg, Germany

[73] Assignee: Fluke Corporation, Everett, Wash.

[21] Appl. No.: 655,995

[22] Filed: May 31, 1996

[51] Int. Cl.⁶ .......................... H04N 17/00; H04N 17/04
[52] U.S. Cl. .......................... 348/181; 348/180; 348/189
[58] Field of Search ..................................... 348/180, 181, 348/182, 183, 184, 185, 189, 191; 345/904; 324/770; H04N 17/00, 17/02, 17/04, 17/06

[56] References Cited

U.S. PATENT DOCUMENTS

| | | | |
|---|---|---|---|
| 4,635,096 | 1/1987 | Morgan | 348/181 |
| 5,117,483 | 5/1992 | Latshaw | 395/100 |
| 5,526,057 | 6/1996 | Flannaghan | 348/557 |

*Primary Examiner*—Nathan Flynn
*Attorney, Agent, or Firm*—George T. Noe

[57] ABSTRACT

A test pattern produced by a television signal generator includes picture elements derived at least substantially from helper lines, and vertically adjacent picture elements of substantially different luminance derived at least substantially from the main picture lines, so that the engineer can readily determine by visual inspection whether or not the helper lines are being decoded.

6 Claims, 5 Drawing Sheets

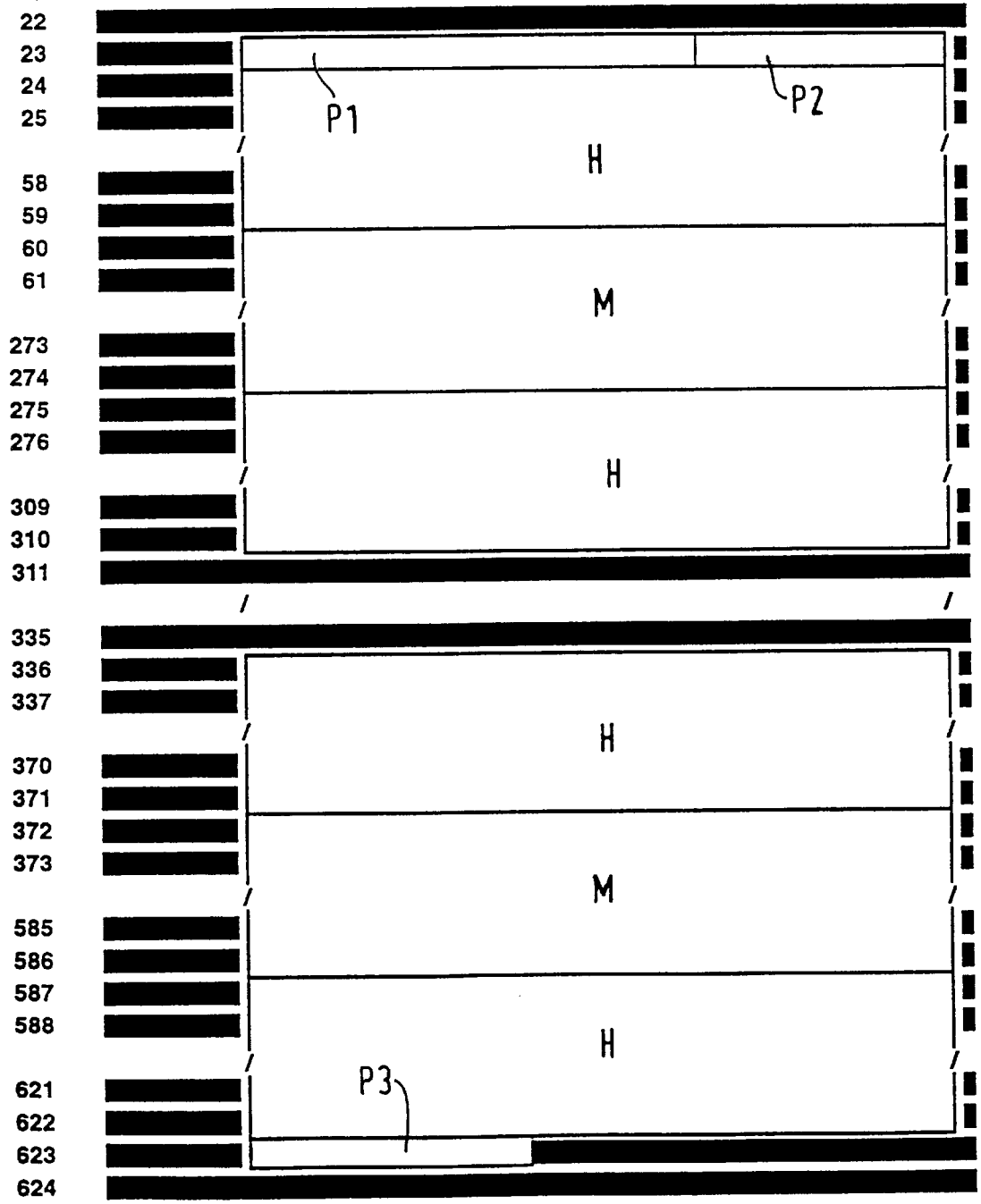

TEST SIGNALS AND TEST SIGNAL GENERATORS

This invention relates to test signals for testing television signal decoders, generators for generating such signals, methods of testing using such signals, and methods of producing test patterns for signal generators. The invention is particularly concerned with the testing of television signal decoders which decode a television signal by merging picture information carried by lines in a main picture portion of the signal with helper information carried by lines in the helper portion of the signal.

It is known to transmit television pictures in a wide screen format, e.g. with an aspect ratio of 16:9. For example, television signals complying with the PAL format normally contain 625 lines per frame, of which, nominally, 576 are active picture lines, and fill the screen of a standard 4:3 aspect ratio television receiver. To obtain wide screen transmission, the picture is transmitted using only, e.g., 430 active picture lines corresponding to the central part of the screen, so that the picture appears in "letterbox" format with black bands above and below the visible picture area. Wide screen televisions, which have a display screen of 16:9 aspect ratio, can also receive these transmissions, and have circuits which can expand the picture vertically so that the active picture content fills the screen. However, the vertical resolution of the picture content remains the same as on a standard 4:3 aspect ratio receiver even though more lines are available to display the picture.

To provide enhanced resolution, it has been proposed to transmit "helper lines" in the black bands, these helper lines containing additional picture information which cannot be seen on standard 4:3 aspect ratio televisions, and which can be decoded and combined with the main picture information in wide screen televisions fitted with appropriate decoders, so as to enhance the vertical resolution. Decoders conforming to the known PALplus system specification perform this and other functions, and the present invention is directed primarily, although not exclusively, to the testing of such decoders.

Known television test signal generators generate signals representing a test pattern which is displayed on the television screen. The test pattern consists of areas having known picture content, with the content throughout each area being constant. That is, the picture elements within an area may have equal luminance and equal chrominance values, or may have luminance values which vary according to a predetermined frequency. Displaying the test pattern enables an engineer involved in the manufacture or servicing of the equipment to assess very quickly, by visual inspection, various aspects of the display. For example, an assessment can be made of the resolution of the picture. However, a problem arises if a standard test signal is used for testing the performance of a decoder which uses helper lines, such as a PALplus decoder, because if the engineer determines that the vertical resolution is not sufficiently high, he has no way of knowing whether this is because the helper lines are not being decoded (e.g. because the receiver is operating in expanded mode in which the 16:9 aspect ratio screen is fitted with the 430 active picture lines), or because of deficiencies in other parts of the circuitry.

Aspects of the present invention are set out in the accompanying claims.

In the preferred embodiment of the present invention, there is provided a test pattern which includes picture elements derived at least substantially from helper lines, and vertically adjacent picture elements of substantially different luminance derived at least substantially from the main picture lines, so that the engineer can readily determine by visual inspection whether or not the helper lines are being decoded.

The techniques of the present invention can be used for testing decoders in any television equipment, such as television receivers, video recorders, etc.

An arrangement embodying the present invention will now be described by way of example with reference to the accompanying drawings, in which:

FIG. 1 diagrammatically illustrates the format of a test signal in accordance with the present invention, the test signal complying with the PALplus format;

Figure 2A:
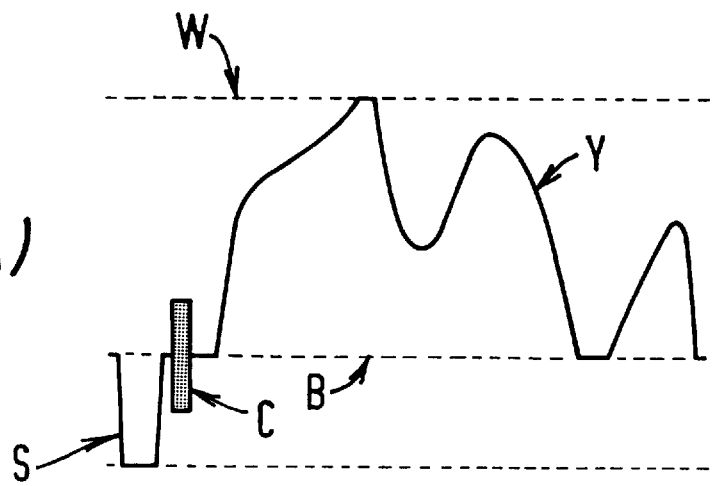
FIG. 2A illustrates the waveform of a horizontal line of the main picture portion of the test signal.

Referring to FIG. 1, a test signal according to the preferred embodiment of the present invention will comply with the PALplus format, and the figure shows diagrammatically the format of one frame. The frame content is similar to that of the well-known 625-line PAL format, when transmitting a wide screen picture in letterbox format using 430 active lines. The main differences are that lines 23 and 623 are used for special purposes, as explained below, the normally black bands (of the "letterbox" picture format) in lines 24 to 59, 275 to 310, 336 to 371 and 587 to 622 (known as "helper" lines) contain additional luminance information, and the content of the helper lines and of the main picture lines 60 to 274 and 372 to 586 have been derived by a special encoding process summarised below. In FIG. 1, column L indicates the line number, with only selected lines of interest being shown, blocks H represent the helper lines, and blocks M represent the main picture lines.

Line 23 contains a first portion P1 which includes signalling bits encoded in the form of white levels of varying duration, for use in transmitting codes representing the nature of the current picture signal (e.g. the aspect ratio). A second portion P2, and portion P3 of line 623, contains reference levels for use by a decoder for setting black and white reference levels and a reference colour burst for synchronising the colour subcarrier. These features, and other features of the PALplus specification, will not be described in more detail as they are not directly relevant to the present invention.

The 576 active picture lines of a standard PAL television signal are encoded, according to the PALplus standard, to derive the 430 main picture lines and the 144 helper lines of the PALplus format signal. The manner in which this is achieved is known to those skilled in the art, but will be briefly summarised below.

The luminance components of the 576 lines could simply be processed by using every fourth line as a helper line, leaving the remainder as main picture lines. However, on a standard television receiver which did not have a PALplus decoder, this would distort the resulting picture. Accordingly, the luminance signal is digitally filtered so that each picture element of a helper line and of a main picture line is formed by a weighted combination of vertically aligned picture elements in the source signal. For example, the luminance value $Y_{OUT}$ of an element n of a line $\ell$ of the main picture portion may be derived from input luminance values $Y_{IN}$ as follows:

$$Y_{OUT}(n,\ell)=(E1\times Y_{IN}(n,i)+E2\times Y_{IN}(n,i-1)+E3\times Y_{IN}(n,i+1))/(E1+E2+E3),$$

where i represents line i of the input signal (and would be a function of $\ell$), and where E1, E2 and E3 are weighting coefficients which may be positive or negative or zero. A similar technique can be used to derive the helper information. (In the preferred embodiment, the helper lines contain information representing how the luminance of a group of source lines changes in the vertical direction, so that uniform luminance in the vertical direction will result in helper lines with low information content.) Although this example indicates that only three vertically-adjacent picture elements of the input signal are used to derive a picture element for the output signal, in practice there would probably be more than three. The purpose of using a digital filter to encode in this manner is to ensure that the resulting main picture lines are a good representation of the source picture, despite the loss of information, so that the picture will not contain artefacts when displayed on a standard 4:3 aspect ratio receiver, while at the same time ensuring that there is no significant overall loss of vertical information so that the picture can be accurately reconstructed on a wide screen receiver with a PALplus decoder.

The coefficients E1, E2, E3 . . . , will generally be different for different lines.

The colour information is similarly encoded, except that the helper lines do not contain any colour information. Thus, the chrominance signal $C_B$ (representing the B–Y colour difference signal) for the 576 input lines is digitally filtered to generate 430 lines of colour information $C_B$ used in the main picture lines M of the PALplus frame. The chrominance information $C_R$ (representing the R–Y colour difference signal) is similarly encoded, preferably using the same filter coefficients. This results in a loss of vertical resolution of the colour information, but this is not perceptible in the decoded picture.

FIG. 2A shows a typical line in the main picture portion of the signal (assuming no colour information is present). This is a standard PAL waveform, including a horizontal synchronising pulse S, a PAL colour burst C, and the luminance signal Y, the amplitude of which represents the luminance and which can vary between the black level B and the white level W.

Figure 2B:
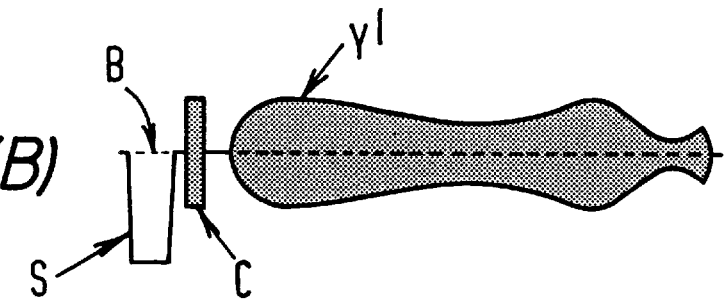
FIG. 2B illustrates the waveform of a helper line.

FIG. 2B represents one of the helper lines. The luminance information is compressed, and then modulated on to the colour subcarrier with the U-phase (i.e. the carrier normally used to carry the $C_B$ chrominance information) as indicated at $Y^1$. This enables luminance information to be transmitted, but prevents it from being perceptible in the black bands above and below the letterbox picture on a standard 4:3 aspect ratio receiver because:

(a) the helper signal is symmetrical around the black level, so that it substantially disappears after filtering;

(b) the overall amplitude of the signal is reduced by the compression function applied to the luminance signal prior to modulation (a corresponding expansion function being applied to the luminance signal after it has been derived in the decoder from the helper lines); and (c) the U-phase colour subcarrier is used for modulation, so that any resulting change of picture content is in dark blue, which is difficult for the human eye to discern.

In the decoder, the luminance signals derived from the helper lines and the main picture lines are subject to digital filtering so as to reconstitute the 576 active lines. Thus, for example, the luminance signal $Y_{OUT}$ for picture element n of a line $\ell$ may be:

$$Y_{OUT}(n,\ell)=(D1\times Y_{IN}(n,i)+D2\times Y_{IN}(n,i1)+D3\times Y_{IN}(n,i+1)+D4\times Y_{IN}(n,h))/(D1+D2+D3+D4),$$

where i represents the line i of the main picture portion of the signal input to the decoder and h represents line h of the helper lines (i and h being functions of $\ell$), and D1 to D4 are coefficients which can be positive, negative or zero, and which would generally differ for different output lines. Although this example indicates that four picture elements of the input signal contribute to each picture element of the output signal, in practice there would normally be more than four, and they may include contributions from more than one helper line.

Thus, in the final picture, each of the picture lines consists of a weighted combination of picture lines in the input signal. Some of the lines in the picture will contain large contributions from helper lines, and indeed in some lines, typically every fourth line, the major contributor will be a helper line. Preferably, in such lines, the contribution from a helper line is predominant in that the coefficient (e.g. D4) associated therewith is greater than the sum of the moduli of all the other coefficients (e.g., D1+D2+D3). Similarly, in at least some of the intervening lines, there is a predominant contribution from a line of the main picture portion.

Figure 3:
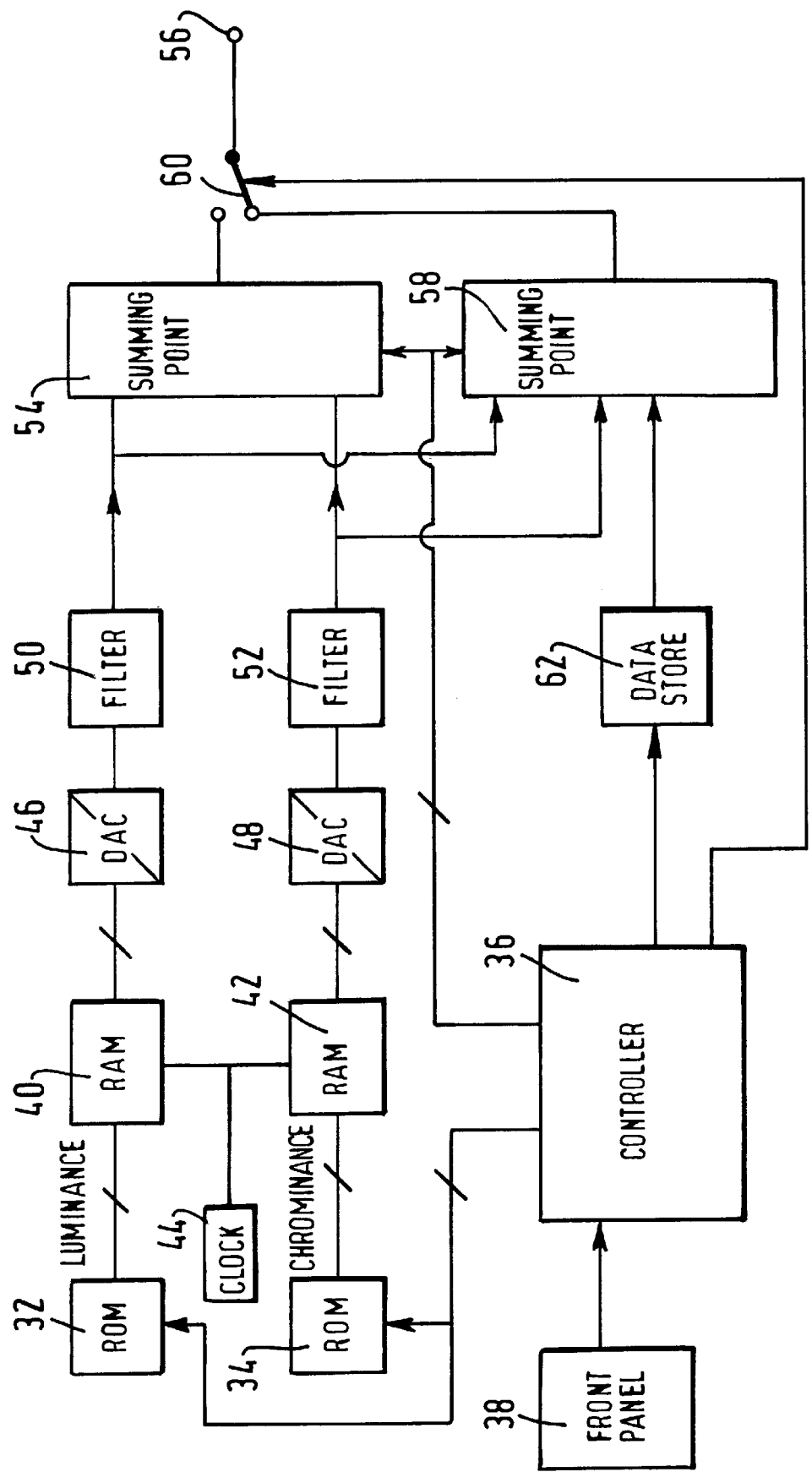
FIG. 3 is a block diagram of a test signal generator according to the present invention.

A test signal generator according to the present invention is shown in FIG. 3. The generator has a luminance ROM 32 and a chrominance ROM 34. The luminance ROM 32 stores the luminance (Y) values of the picture elements of a plurality of test patterns, and the chrominance ROM 34 stores the corresponding chrominance values ($C_B$, $C_R$) for those picture elements. A controller 36 is responsive to the operation of switches on a front panel 38 for controlling the operation of the system. In particular, the front panel 38 can be used to select a desired one of the test patterns, and in response thereto the controller 36 will cause the luminance and chrominance values associated with those test patterns to be read out of the ROMs 32 and 34 and delivered to respective random-access memories (RAMs) 40 and 42. The contents of RAM 40 and RAM 42 are then read out at a predetermined rate, using a clock 44, and delivered to digital-to-analog converters (DACs) 46 and 48, and then to respective filters 50 and 52, the outputs of those filters thus forming the analog luminance and chrominance values for the test pattern. (For simplicity, only one channel is shown for the chrominance signals, but in practice at least the analog circuits would have a channel for each of the two chrominance signals.) The luminance and chrominance signals are applied to a summing point 54, which can produce an output signal in standard (e.g. PAL) format delivered to an output terminal 56.

The above type of operation is conventional in television signal generators.

The generator also has a PALplus summing point 58 arranged to receive the luminance and chrominance signals. The controller 36 can, using a switch schematically illustrated at 60, determine whether the output should be in standard PAL format or PALplus format. Assuming that PALplus format is selected, the controller 36 will also cause a wide screen data store 62 to provide to the summing point 58 a number of data bits which will vary depending upon the particular pattern selected. The PALplus summing point 58 will convert the luminance signal, the chrominance signal and the wide screen data bits into a PALplus format signal as shown in FIG. 1, the data bits being used to control the signal generated during period P1 of line 23.

It will be understood that, because the compressed helper line luminance information is transmitted by modulating the U-phase colour subcarrier, this can easily be achieved by storing it as $C_B$ data in the appropriate area of the chrominance ROM 34.

FIG. 3 omits other parts of the signal generator which are known per se and not of particular relevance to the present invention.

Figure 4:
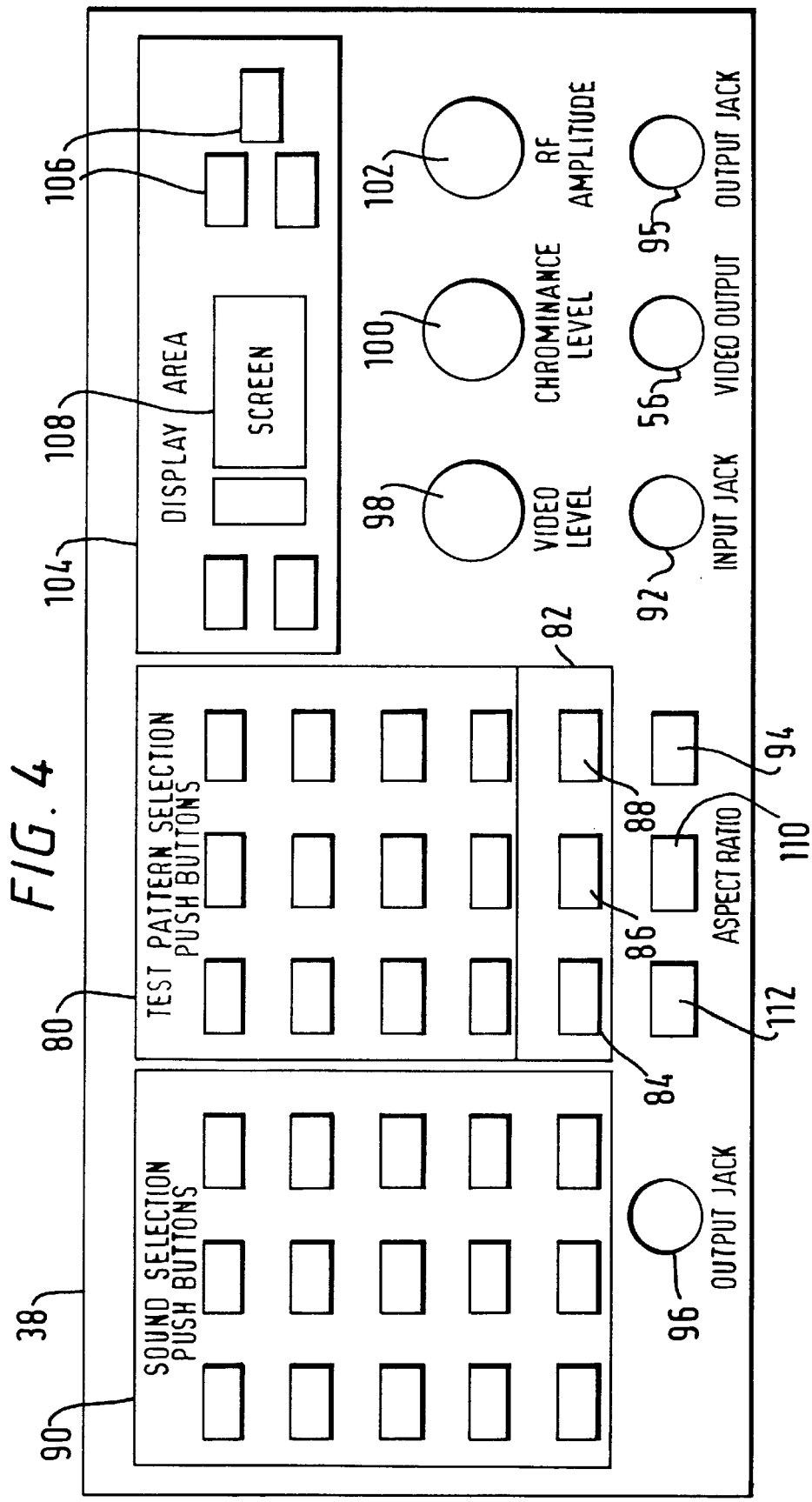
FIG. 4 illustrates the front panel of the generator.

The front panel 38 is shown in FIG. 4. The panel has regions 80 and 82 containing push buttons for selection of a test pattern. Each push button is associated with a respective test pattern. The section 80 contains push buttons associated with standard test patterns for use with both PAL and PALplus decoders. The section 82 contains three push buttons for generating test patterns particularly useful for the testing of PALplus decoders. Pressing any of the buttons within this section will cause the generation of an output signal in PALplus format.

Pressing the first button 84 causes the generation of a test signal according to the present invention, which will be described in more detail below. Pressing a second button 86 causes the generation of a zone plate test signal consisting of concentric circles and particularly suitable for testing for cross-colour interference patterns. Two versions of each of these two patterns are stored in the ROMs 32 and 34. If the appropriate button is pressed once, the first version of the pattern is retrieved and output in "film" mode, and if pressed twice the second version is generated and output in "camera" mode. These modes, which are recognised under the PALplus standard, differ primarily in that, in film mode, the picture content of each of the two fields within a single frame is stable, whereas in camera mode the picture content may represent movement between the fields. The main effect this has in the generator of the present invention is that the nature of the bits produced by the wide screen signal generator 62 differs depending upon the mode. (The contents of the two versions are also different, reflecting the different encoding processes applied to a source signal depending upon the chosen mode.)

The third PALplus pattern, generated by pressing push button 88, is used for testing the so-called motion adaptive colour plus feature of the decoder, and is the subject of a separate European patent application no. 95303833.8, filed 2nd Jun., 1995 and corresponding to U.S. Ser. No. 08/655, 996, filed May 31, 1996, the disclosures of which are incorporated herein by reference.

The front panel 38 also has an area 90 containing push buttons for use in selection of different sound signals which can be added to the test pattern signal, and which are not relevant to the present invention. There are also the video output terminal 56, an input terminal 92, a push button 94 which allows the output to be derived either from the internally-generated signal or from the input applied to input terminal 92, another output terminal 95 which contains an RF modulated version of the output signal, an output terminal 96 for supplying horizontal and vertical synchronising pulses, control knobs 98, 100 and 102 for controlling, respectively, the video level, the chrominance level and the RF amplitude, and a display area 104 which contain push buttons (e.g. 106) for controlling the nature of the information displayed on a screen 108.

The front panel 38 also has a switch 110 which switches the aspect ratio of the generated test pattern between 4:3 and 16:9, and a further switch 112 which controls the summing point 54 so that it behaves as either a SECAM or PAL/NTSC modulator. (Two thumbwheel switches (not shown) on the rear of the generator select between PAL and NTSC, and between different versions of SECAM.)

Figure 5:
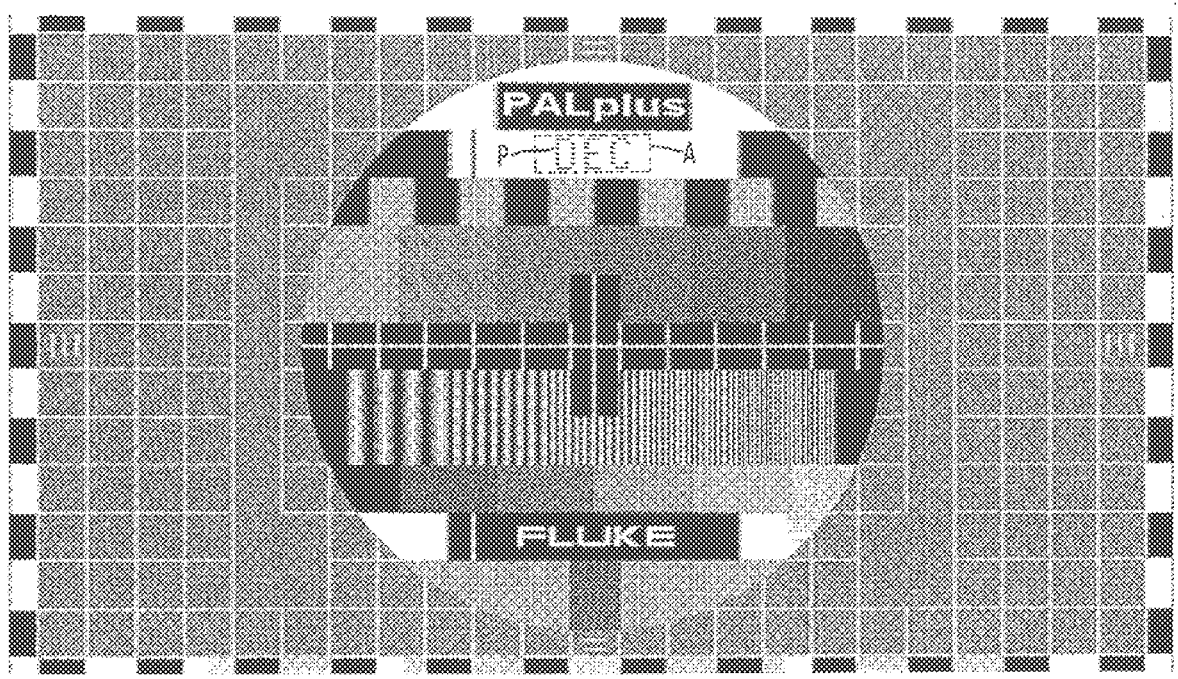
FIG. 5 shows a test pattern defined by the test signal of the invention.

The test pattern according to the invention, which is generated by pressing push button 84, is illustrated in FIG. 5. In common with many test patterns, this contains areas of constant chrominance and luminance content, and other areas in which the luminance content varies at a frequency which is fixed within the area, but which differs from the frequency in other areas.

The area of particular interest to the present invention is indicated at A in FIG. 5. Most of this area is white. In common with the remainder of the test pattern, the picture elements in the test pattern have been derived from the main picture portion of the test signal and from the helper lines, as described above. Within the area A, there are specific picture elements indicated at P which are derived predominantly from the helper lines, and not substantially from the main picture portion. The test pattern is so configured that the luminance of these picture elements differs substantially from that of the vertically adjacent picture elements, and in the present embodiment it is substantially black. (Although this is the preferred arrangement, there are other possibilities, e.g. having the picture elements derived substantially from the helper lines white, and the surrounding elements black. There may be differences in colour, as well as luminance, bit in this embodiment relying on colour differences alone would not work, because the helper lines do not contain colour information.)

Preferably, the picture elements derived predominantly from the helper lines collectively define alpha-numeric characters to make them more easily discernable by an observer (in this case the letters "DEC", short for the English word decoded). The observer can therefore easily determine whether or not the helper lines are being decoded by a PALplus decoder; if not, the characters formed by picture elements P will be invisible and the area A will be totally white.

The data stored in the ROMs 32 and 34 defining the test pattern shown in FIG. 5 can be derived in the following way.

A test pattern corresponding to that shown in FIG. 5, but with the area A completely white, is generated using standard software packages, and then the data defining the luminance components of the picture elements and data defining the chrominance components $C_B$ and $C_R$ are separately stored. Also, a second pattern is generated, this being exactly the same as the first pattern except that within the area A the appropriate alpha-numeric characters are placed in solid black. The resulting data is stored as before. Then the final pattern is derived by combining the luminance information from the first pattern with the chrominance information from the second pattern. As indicated above, the luminance information which is carried by the helper lines is first converted into chrominance ($C_B$) information for modulating the chrominance subcarrier. Therefore, the luminance information relating to the alpha-numeric characters will disappear, except for that carried by the helper lines. This will result in the pattern shown in FIG. 5, wherein the alpha-numeric characters disappear, except for individual portions derived from the helper lines. By way of an alternative, the final pattern can be created by combining the luminance and chrominance information relating to the helper line areas of the second pattern with the luminance and chrominance information relating to the main picture portion of the first pattern. As a further alternative, the final pattern could be derived from all the picture information of the first pattern, except for the $C_B$ information which is derived from the second pattern.

Figure 6:
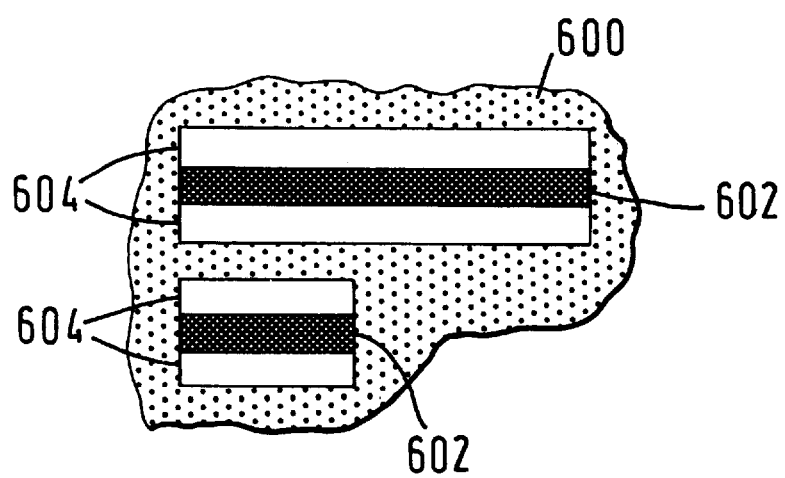
FIG. 6 schematically illustrates a portion of the test pattern of FIG. 5.

FIG. 6 shows a small portion of the area A in more detail. The background indicated at 600 is generally white. The picture elements 602 derived primarily from the helper lines are black, although slightly lighter than pure black because of the filtering operation mentioned above, which results in white, vertically-close picture elements of the source signal providing a small contribution to the picture elements 602. Depending upon the appropriate filtering coefficients, the areas 604 above and below the picture elements 602 may be slightly brighter than the main background area 600. This is because the coefficients may be such that the helper lines make a negative contribution to the picture elements in the areas 604.

The filtering operations, and the removal of those parts of the characters which are derived from the main picture portion, make the alpha-numeric characters in area A unclear. Nevertheless, the presence of the picture elements resulting predominantly from the helper lines is clearly visible, so that the operation of the decoder can be ascertained quickly.

In the above embodiment, the PAL and PALplus test patterns are generated using the same ROMs, RAMs, filters, clocks, etc. If desired, separate circuitry can be provided for PAL and PALplus patterns; this would reduce the amount of memory storage required, because PAL test patterns can be stored using less data.

We claim:

1. A signal generator for testing a television signal decoder which decodes a television signal by merging picture information carried by lines in a main picture portion of the signal with helper information carried by lines in a helper portion of the signal, in such a way that the decoder presents an output defining a picture containing lines whose contents are derived at least substantially from the helper information interleaved with lines whose contents are derived at least substantially from the main picture information, the generator having a circuit for generating a test signal which has a helper line which causes, in the decoded picture, a picture element to have a luminance substantially different from that of picture elements vertically adjacent thereto, so as to allow the determination, by visual inspection of the picture, that the helper information has been decoded.

2. A method of testing a television signal decoder which decodes a television signal by merging picture information carried by lines in a main picture portion of the signal with helper information carried by lines in a helper portion of the signal, in such a way that the decoder presents an output defining a picture containing lines whose contents are derived at least substantially from the helper information interleaved with lines whose contents are derived at least substantially from the main picture information, the method comprising:
 (a) applying a test signal to the decoder, the test signal having a helper line which causes, in the decoded picture, a picture element to have a luminance substantially different from that of picture elements vertically adjacent thereto, so as to allow the determination, by visual inspection of the picture, that the helper information has been decoded;
 (b) observing a picture generated by an output of the decoder; and
 (c) determining whether the decoder is decoding the helper lines by visual inspection of the picture to determine the presence of picture elements derived at least substantially from the helper information and of substantially different luminance from that of vertically adjacent picture elements.

3. A method of deriving a test pattern for testing a television signal decoder which decodes a television by merging picture information carried by lines in a main picture portion of the signal with helper information carried by lines in a helper portion of the signal, in such a way that the decoder presents an output defining a picture containing lines whose contents are derived at least substantially from the helper information interleaved with lines whose contents are derived at least substantially from the main picture information, the method comprising:
 (a) generating a first test pattern and storing data defining that first test pattern;
 (b) generating a second test pattern, which corresponds to the first test pattern except in an area which contains picture elements having a luminance value different from those of the corresponding area in the first test pattern, and storing data defining said second test pattern; and
 (c) selecting part of the data defining the first pattern and part of the data defining the second pattern, and combining the selected parts to derive data defining a third test pattern, the derived data including helper data defining helper lines and main picture data defining main picture lines, the helper data defining luminance values derived from the first pattern and the main picture data defining luminance values derived from the second pattern.

4. A method as claimed in claim 3, wherein each of said first and second data comprises luminance data and chrominance data, the chrominance data associated with helper lines being derived from luminance data in the original test pattern, and wherein the step (c) comprises selecting the luminance data associated with the first pattern and selecting at least part of the chrominance data associated with the second pattern.

5. A method as claimed in claim 3, wherein step (c) comprises selecting the data associated with the helper lines of the first test pattern and selecting data associated with the main picture lines of the second pattern.

6. A memory storing data defining a test pattern for use in testing a television signal decoder which decodes a television signal by merging picture information carried by lines in a main picture portion of the signal with helper information carried by lines in a helper portion of the signal, in such a way that the decoder presents an output defining a picture containing lines whose contents are derived at least substantially from the helper information interleaved with lines whose contents are derived at least substantially from the main picture information;

the test pattern including a helper line which causes, in the decoded picture, a picture element to have a luminance substantially different from that of picture elements vertically adjacent thereto, so as to allow the determination, by visual inspection of the picture, that the helper information has been decoded.

\* \* \* \* \*